United States Patent [19]

Ejiri

[11] Patent Number: 5,250,354
[45] Date of Patent: Oct. 5, 1993

[54] MAGNETIC RECORDING MEDIUM CONTAINING MAGNETIC ALLOY POWDER AND SPECIFIED BINDER RESINS AND HAVING A KERR ROTATIONAL ANGLE OF 5 MINUTES OR MORE

[75] Inventor: Kiyomi Ejiri, Kanagawa, Japan

[73] Assignee: Fuji Photo Film Co., Ltd., Kanagawa, Japan

[21] Appl. No.: 689,589

[22] Filed: Apr. 19, 1991

[30] Foreign Application Priority Data

Apr. 20, 1990 [JP] Japan .................... 2-103107

[51] Int. Cl.$^5$ ............................... G11B 5/00
[52] U.S. Cl. ............................... 428/336; 428/424.6; 428/425.9; 428/522; 428/694 BY; 428/900; 428/694 BU
[58] Field of Search ............ 428/336, 424.6, 425.9, 428/522, 694, 900

[56] References Cited

U.S. PATENT DOCUMENTS

| | | | |
|---|---|---|---|
| 4,548,772 | 10/1985 | Kawamata | 264/26 |
| 4,597,990 | 7/1986 | Roller et al. | 427/130 |
| 5,084,341 | 1/1992 | Hashimoto | 428/328 |
| 5,085,941 | 2/1992 | Ohkubo | 428/424.6 |

*Primary Examiner*—Stevan A. Resan
*Attorney, Agent, or Firm*—Sughrue, Mion, Zinn, Macpeak & Seas

[57] ABSTRACT

A magnetic recording medium excellent in electromagnetic characteristics and running durability and a method for producing the same are disclosed, the magnetic recording medium comprising a non-magnetic support and a magnetic layer formed thereon, the magnetic layer containing a magnetic alloy powder and a binder, wherein said magnetic alloy powder has a length in the long axis of 2,000 Å or less and a saturation magnetization ($\sigma s$) of 100 emu/g or more; said binder contains a vinyl chloride copolymer, a polyisocyanate, and a polyurethane resin, wherein the polyurethane resin has at least 3 hydroxyl groups per molecule and at least $1 \times 10^{-5}$ eq/g of at least one type of polar group selected from the group consisting of $-SO_3M$, $-OSO_3M$, $-COOM$, $-PO(OM')_2$ and $-OPO(OM')_2$ (wherein each of M and M' represents a hydrogen atom, an alkali metal or ammonium ion) and the polyurethane resin is used in an amount equal to or more than by weight that of the polyisocyanate, and wherein the vinyl chloride copolymer has at least $1 \times 10^{-5}$ eq/g of at least one type of polar group selected from the group consisting of $-SO_3M$, $-OSO_3M$, $-COOM$, $-PO(OM')_2$ and $-OPO(OM')_2$ (wherein each of M and M' represents a hydrogen atom, an alkali metal or ammonium ion); and a Kerr rotational angle measured at a surface of the magnetic layer is 5 minutes or more.

10 Claims, No Drawings

MAGNETIC RECORDING MEDIUM CONTAINING MAGNETIC ALLOY POWDER AND SPECIFIED BINDER RESINS AND HAVING A KERR ROTATIONAL ANGLE OF 5 MINUTES OR MORE

FIELD OF THE INVENTION

The present invention relates to a magnetic recording medium and a method for producing the same.

BACKGROUND OF THE INVENTION

Magnetic recording media are widely used as audio tapes, video tapes, magnetic tapes for computers and the like.

The magnetic recording medium basically comprises a non-magnetic support and magnetic layers formed thereon.

Recently, for magnetic recording media such as audio tapes, video tapes and magnetic tapes for computers, there have been strong demands for higher density recording, for example, by shortening recording wavelengths together with requirements to further improve electromagnetic characteristics.

In response to such demands, the coercive force of fine ferromagnetic powders used has been improved. For example, fine ferromagnetic powders having a coercive force of 500 Oe or more have been used. However, even if the fine ferromagnetic powders having high coercive force are used, there remains the problem that improvements in electromagnetic characteristics are insufficient. In particular, improvements in reproduced outputs of short wavelengths are inadequate.

Usually, various signals ranging from a short wavelength to a long wavelength are recorded on the magnetic recording medium. These signals are not uniformly recorded in the magnetic layer, but are recorded in different portions thereof depending on their wavelength.

Specifically, the signals on the short wavelength side ($\lambda \leq 0.6$ $\mu$m) have a tendency to be recorded in portions relatively near to the surface of the magnetic layer, and the signals on the long wavelength side ($\lambda \geq$ about 2 $\mu$m) are more likely to be recorded at greater depth portions (portions near to the non-magnetic support) of the magnetic layer.

On the other hand, when attention is given to the relationship between the reproduced output of a wavelength of a recorded signal and the filling rate of the fine ferromagnetic powder of the magnetic layer, an improvement in reproduced output is not necessarily proportional to an increase in filling rate. The required filling rate of the fine ferromagnetic powder varies depending on the characteristics of the wavelength of the recorded signal.

Namely, to record the signals on the short wavelength side, the filling rate of the fine ferromagnetic powder contained in the magnetic layer (the weight of the fine ferromagnetic powder per unit area of the magnetic layer, unit: g/cm$^2$) is required to be relatively high, whereas to record the signals on the long wavelength side, the filling rate of the fine ferromagnetic powder is not required to be as high as with the recording of the signals of the short wavelength side.

As methods for improving the electromagnetic characteristics of the magnetic recording media, the methods of increasing the filling rate of the fine ferromagnetic powders through the entire thickness of the magnetic layer are generally used.

As described above, however, the signals recorded on the magnetic recording medium are recorded in different depth portions of the magnetic layer and the filling rate of the fine ferromagnetic powder required for the recording varies depending on the wavelength characteristics of the recorded signal. For this reason, if the fine ferromagnetic powder is uniformly filled through the entire thickness of the magnetic layer at a filling rate more suitable for long wavelength recording, the magnetic layer will be insufficient for short wavelength recording. There is therefore the problem that the reproduced output of the short wavelength signal is not sufficiently improved. On the other hand, if a high filling rate more suitable for short wavelength recording is selected, not only can no improvement be expected in most cases in the reproduced output of the long wavelength signal (which reaches the saturated state at a low filling rate), but also the flexibility of the magnetic layer is reduced, which results in adverse effects on the running properties.

A magnetic recording medium has been proposed having a non-magnetic support and a magnetic layer formed thereon with the magnetic layer containing a fine ferromagnetic powder having a coercive force of 500 Oe or more dispersed in a binder, and in which R$^1$/R$^2$ is 1.1 or more, wherein R$^1$ represents the average filling rate of the fine ferromagnetic powder within the range from the surface of the magnetic layer to a depth of 1 $\mu$m, and R$^2$ represents the average filling rate of the fine ferromagnetic powder within the range from the magnetic layer face in contact with the non-magnetic support to 1 $\mu$m therefrom (JP-A-62-31018, the term "JP-A" as used herein means an "unexamined published Japanese patent application").

However, an object of this proposed magnetic recording medium was to improve the sensitivity of the short wavelength signals by increasing the average density of the ferromagnetic powder in the layer near to the surface (within 1 $\mu$m). This proposed magnetic recording medium is actually effective. However, the ferromagnetic powder is not sufficiently suitable for the short wavelength signals, and the binder used is not satisfactory in dispersibility. Consequently, satisfactory C/N can not be obtained. Further, the binder contains an excess of isocyanate, so that migration to the surface of the magnetic layer takes place in the coating step. Also, when the amount of the binder contained in the upper layer of a plural magnetic layer arrangement is reduced to increase the filling rate, a distribution of the binder is produced in the upper layer in order to reduce the filling rate at the surface, which results in inadequate short wavelength recording ($\lambda \leq 0.6$ $\mu$m). If attempts are made to increase the filling rate by sputtering the surface of the single magnetic layer with electron beams (EB) to solve this problem, the excess isocyanate contained in the surface of the magnetic layer are removed. However, a lubricating agent is also liable to be lost at the same time, whereby the problem of deterioration of the running properties tends to occur due to the loss of lubricating agent.

SUMMARY OF THE INVENTION

One object of the present invention is to provide a magnetic recording medium excellent in electromagnetic characteristics and running durability.

Another object of the present invention is to provide a method for producing such a magnetic recording medium.

The above-described objects can be attained by the present invention hereinafter described.

In accordance with the precepts of the present invention, a magnetic recording medium is provided having a non-magnetic support and a magnetic layer formed thereon containing a ferromagnetic alloy powder and a binder, wherein said ferromagnetic alloy powder has a length in the long axis of 2,000 Å or less and a saturation magnetization ($\sigma$s) of 100 emu/g or more; the binder contains a vinyl chloride copolymer, a polyisocyanate and a polyurethane resin, wherein the polyurethane resin has at least 3 hydroxyl groups per molecule and at least $1 \times 10^{-5}$ eq/g of at least one type of polar group selected from the group consisting of $-SO_3M$, $-OSO_3M$, $-COOM$, $-PO(OM')_2$ and $-OPO(OM')_2$ (wherein each of M and M' represents a hydrogen atom, an alkali metal or ammonium ion) and the polyurethane resin is used in an amount equal to or more than by weight that of the polyisocyanate, and wherein the vinyl chloride copolymer has at least $1 \times 10^{-5}$ eq/g of at least one type of polar group selected from the group consisting of $-SO_3M$, $-OSO_3M$, $-COOM$, $-PO(OM')_2$ and $-OPO(OM')_2$ (wherein each of M and M' represents a hydrogen atom, an alkali metal or ammonium ion); and a Kerr rotational angle measured at a surface of the magnetic layer is 5 minutes or more.

The present invention provides a method for producing a magnetic recording medium having a Kerr rotational angle measured at a surface of a magnetic layer of 5 minutes or more, wherein the method comprises the steps of kneading a ferromagnetic alloy powder with a polar group-containing polyurethane resin having at least 3 hydroxyl groups per molecule, a polar group-containing vinyl chloride copolymer and a solvent to disperse the ferromagnetic alloy powder therein; adding a polyisocyanate in an amount by weight less than that of the polyurethane resin immediately before coating to obtain a magnetic coating; coating the resulting magnetic coating on a non-magnetic support to form a magnetic layer; drying the magnetic layer; and then subjecting the magnetic layer to a super calender treatment using at least one pair of metal rolls having a center line average surface roughness (Ra) of not more than 10 nm (cutoff value: 0.25 mm).

DETAILED DESCRIPTION OF THE INVENTION

In the present invention, the ferromagnetic alloy powder is relatively short in length in the long axis and relatively high in saturation magnetization ($\sigma$s) is dispersed by using the polyurethane resin having at least $1 \times 10^{-5}$ eq/g of the polar groups and the vinyl chloride copolymer having at least $1 \times 10^{-5}$ eq/g of the polar groups to improve the C/N and the RF output, and the above-described polyurethane resin contains at least 3 hydroxyl groups per molecule to enhance reactivity. Further, the polyisocyanate is contained in an amount by weight of less than that of the polyurethane, thereby ensuring the running durability. In addition, the above-described ferromagnetic alloy powder is kneaded with a magnetic solution containing the binder having the polar group-containing polyurethane and polar group-containing vinyl chloride copolymer to disperse the ferromagnetic alloy powder therein, followed by addition of the above-described polyisocyanate immediately before coating to obtain a magnetic coating solution. Then, a non-magnetic support is coated with the resulting magnetic coating solution to form a magnetic layer. After drying, the magnetic layer is subjected to a super calender treatment using at least one pair of metal rolls having very smooth surfaces such as hard chrome-plated or ceramic-coated metal rolls and rolls whose surfaces are formed of super-hard alloy. As a result, the ferromagnetic alloy powder is orientated at a very high filling rate, the Kerr rotational angle exhibits 5 minutes or more, and the electromagnetic characteristics and the running durability are compatible with each other.

Namely, the use of the ferromagnetic alloy powder having a short length in the long axis for high density recording causes a reduction in noise, enhancement of sensitivity and a contribution to an improvement in C/N. However, the ferromagnetic alloy powder having a saturation magnetization ($\sigma$s) as high as 100 emu/g or more is extremely poor in dispersibility. Accordingly, the dispersibility is therefore ensured by introducing specified amounts or more of polar groups in both of the vinyl chloride copolymer as a main binder component for maintaining hardness together with the polyurethane resin as a subsidiary binder component for imparting flexibility. Moreover, the polyisocyanate is used in small amounts and a polyurethane having reactive hydroxyl groups is used. As a result, the polyisocyanate does not migrate so as to undesirably localize in the surface of the magnetic layer. Consequently, the short wavelength recording at wavelengths ($\lambda$) of 0.6 $\mu$m or less is not deteriorated due to the avoidance of exudation of polyisocyanate. More over, no forced mechanical process for removing the excess polyisocyanate contained in the surface of the magnetic layer is needed, so that the lubricating agent necessary for lubrication is left intact in the surface of the magnetic layer and the running properties are not deteriorated.

The smooth surface of the magnetic layer having a Kerr rotational angle as high as 5 minutes or more would ordinarily be increased in $\mu$ value. Hence, it would have been expected that the durability is liable to be deteriorated. In the present invention, however, this problem is solved by the use of reduced amounts of the polyisocyanate and the polyurethane resin having at least 3 hydroxyl groups per molecule so that the hardening reaction proceeds to completion.

The Kerr rotational angle ($\theta$K) as defined in the present invention means an angle of the Kerr rotation in a longitudinal case. When polarized light is reflected from the surface of a magnetized sample, the angle of polarization rotates in rough proportion to the magnetized amount (magnetizing force) of the sample. This angle is called a Kerr rotational angle. The Kerr rotational angle defined herein is a Kerr rotational angle corresponding to a state in which the sample is magnetized and an external magnetic field is released (so-called residual magnetization). The measurement of the Kerr rotational angle is disclosed, for example, in U.S. Pat. No. 4,816,761, The Review of SCIENTIFIC INSTRUMENTS, Vol. 43, No.12, P.842 (1972), and Inspec, No. 9, P.46 (1986).

Thus, the Kerr rotational angle of the surface of the magnetic layer is a measure of the filling rate and the orientation of the ferromagnetic alloy powder existing in the surface of the magnetic layer. Conventional magnetic recording media products have a Kerr rotational angle of about 1.5 minutes, and even products in which polar group-containing binders high in dispersibility are used have a Kerr rotational angle of only about 4.5 minutes.

In the present invention, a Kerr rotational angle at a surface of the magnetic layer is 5 minutes or more, preferably 10 minutes or more.

The super calender treatment performed in the present invention preferably comprises a step in which heating and pressurizing are carried out using at least one pair of stages (two steps), more preferably at least three stages and most preferably three to nine stages of rigid rolls. As the above-described rigid rolls, for example, metal rolls are preferably used which have a center line average surface roughness (Ra: cutoff value 0.25 mm) of 10 nm and further a Young's modulus of 10,000 to 100,000 kg/mm$^2$. Examples of the rigid rolls include various hard chrome-plated or ceramic-coated metal rolls and rolls whose surfaces are formed of super-hard alloy. A step using a combined roll unit of a rigid roll and an elastic roll, which is used in the normal calender treatment, may be added before and/or after the step using a pair of rigid rolls.

The calender treatment described above is preferably carried out at a temperature of 50 to 110° C., preferably 50° to 100° C., and under a line pressure of 150 to 1,000 kg/cm, preferably 150 to 380 kg/cm and a line speed of 30 to 300 m/min. The metal rolls may be vertically or horizontally arranged.

As examples of suitable super calender units, units described in JP-A- 54-65764 and JP-A-60-34828 can be used. For example, metal rolls are preferably used as the rigid rolls, and it is desirable that outer cylindrical members of carbon steel or hard ceramics are plated with Cr, Zn, Sn, Cu and Ni, or that the rolls are formed of tungsten carbide (WC) or a material mainly composed of cobalt and have a surface hardness (Vickers hardness) of 450 degrees or more, preferably 700 degrees or more.

The ferromagnetic alloy powder which can be used in the present invention include Fe, Co, an Fe-Co alloy, an Fe-Ni alloy, an Fe-Co-Ni alloy, a Co-Ni-P alloy, a Co-Ni-Fe-B alloy, an Fe-Ni-Zn alloy, a Ni-Co alloy, a Co-Ni-Fe alloy, an Fe-N alloy, an Fe-Co-Cr alloy, and a Mn-Bi alloy, and also other ferromagnetic alloys known in the art.

Examples of methods for producing the ferromagnetic alloy powders include the following methods:

(a) A method in which a complex organic acid salt (mainly an oxalic acid salt) is reduced with a reducing gas such as hydrogen;

(b) A method in which iron oxide is reduced with a reducing gas such as hydrogen to obtain Fe or Fe-Co particles;

(c) A method in which a metal carbonyl compound is thermally decomposed;

agent such as sodium (d) A method in which a reducing borohydride, a hypophosphite or hydrazine is added to an aqueous solution of a ferromagnetic metal to conduct reduction;

(e) A method in which a ferromagnetic metal powder is electrolytically deposited by the use of a mercury cathode and then separated from mercury; and (f) A method in which a metal is vaporized in a low-pressure inert gas to obtain a fine powder.

The ferromagnetic powders are required to have a length in the long axis of 2,000 Å or less, preferably 700 Å to 2,000 Å. The lower limit of the length in the long axis is about 400 Å. The saturation magnetization ($\sigma s$) of the ferromagnetic powders ranges from 100 to 140 emu/g, and preferably from 120 to 140 emu/g. If the saturation magnetization ($\sigma s$) exceeds 140 emu/g, the dispersion of the ferromagnetic powder is deteriorated and no improvement in electromagnetic characteristics can be observed. Prior to the dispersion, the surfaces of the ferromagnetic particles may be impregnated with dispersing agents, lubricating agents, antistatic agents or other conventional agents in solvents for their respective purposes to adsorb them. It is preferred that the ferromagnetic powders contain nonmagnetic materials or compositions such as Sr, Pd, Mn, Ni, Cd, Cr, Al, Si, Ti, Cu and Zn in amounts of 10% by weight or less. The ferromagnetic powders may be coated with alumina by fusion.

Of the binder components used in the present invention, the polar group-containing polyurethane resins are described below.

Repeat units having polar groups which constitute the polyurethane resins have any of —SO$_3$M, —OSO$_3$M, —COOM, —PO(OM')$_2$ and —OPO(OM')$_2$ (wherein each of M and M' represents a hydrogen atom, an alkali metal such as K and Na or ammonium ion). The polyurethane resins may contain these repeat units alone or in combinations of two or more thereof. The polar groups are contained in amounts of at least $1 \times 10^{-5}$ eq/g, preferably $1 \times 10^{-5}$ to $5 \times 10^{-4}$ eq/g, and more preferably $4 \times 10^{-5}$ to $2 \times 10^{-4}$ eq/g.

The above polar groups can be derived from polybasic acids and polyols used as starting materials for forming the polyurethane resins. Examples of polybasic acids having the polar groups and polyols having the polar groups include 5-sulfoisophthalic acid, 2-sulfoisophthalic acid, 4-sulfophthalic acid, 3-sulfophthalic acid, dialkyl 5-sulfoisophthalates, dialkyl 2-sulfoisophthalates, alkyl 4-sulfophthalates, alkyl 3-sulfophthalates and sodium salts or potassium salts thereof, dimethylolpropionic acid and sodium salts or potassium salts thereof.

The polyurethane resin having the polar groups and at least 3 hydroxyl groups per molecule which are used in the present invention means a polymer in which the polar groups and the hydroxyl groups are introduced in a conventional polymer skeleton having at least urethane linkages represented by

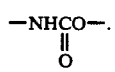

Preferred examples of the polymer skeletons of the polyurethane resins include polyesterpolyurethanes, polyetherpolyurethanes, polycarbonatepolyurethanes and polycarbonateesterpolyurethanes, which are obtained by reaction of polyol skeletons such as polyesterpolyols, polyetherpolyols, polycarbonatepolyols and polycarbonate-esterpolyols with polyisocyanates. The polyesterpolyols include polyesterpolyols synthesized by reaction of organic dibasic acids such as phthalic acid, adipic acid, dimerized linolenic acid and maleic acid with at least two arbitrary polyols selected from glycols such as ethylene glycol, propylene glycol, butylene glycol and diethylene glycol and polyhydric alcohols such as trimethylolpropane, hexanetriol, glycerol, trimethylolethane and pentaerythritol; and lactone series polyesterpolyols synthesized from lactones such as ε-caprolactone, α-methyl-ε-caprolactone, ε-methyl-ε-caprolactone and γ-butyrolactone. The polyetherpolyols include (1) polyoxyalkylene glycols such as polyoxyethylene glycol, polyoxypropylene glycol and polyhexamethylene glycol; (2) polyalkylene-arylene ether glycols such as propylene glycol-bisphenol A copolymers; (3) polyalkylene-arylene etherthioether glycols such as propylenethioether glycol-bisphenol A copolymers; and (4) polyalkylene etherthioether glycols such as ethylene glycol-propylenethioether glycol copolymers.

The polycarbonatepolyols are not particularly limited as long as they are polyol polymers having carbonate linkages

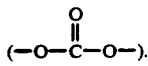

For example, they can be preferably obtained by condensation of aliphatic polyhydric alcohols having 2 to 10 carbon atoms with phosgene, chloroformates, dialkyl carbonates or diallyl carbonates.

The above-described polyhydric alcohols include 1,10-decanediol, 1,6-hexanediol, 1,4-butanediol, 1,3-butanediol, neopentyl glycol and 1,5-pentanediol.

The polycarbonateesterpolyols are formed by condensation of the above-described polycarbonatepolyols, preferably having a molecular weight of 200 to 1,000, with organic dibasic acids having 2 to 20 carbon atoms, preferably 2 to 10 carbon atoms. Preferred examples of the organic dibasic acids include adipic acid and 1,10-decanedicarboxylic acid.

As the polyisocyanates forming the urethane linkages with the above-described kinds of polyols, polyisocyanates known in the art can be used and are not particularly limited. Aromatic, aliphatic or alicyclic polyisocyanates are used. Preferred examples thereof include o- or m-tolylene diisocyanate, 4,4'-diphenylmethane diisocyanate, m-xylylene diisocyanate, m-phenylene diisocyanate, 4,4-biphenylene diisocyanate, 1,4-cyclohexylene diisocyanate, 1,5-tetrahydronaphthalene diisocyanate, 1,6-hexamethylene diisocyanate, 4-chloro-1,3-phenylene diisocyanate and 1,5-naphthalene diisocyanate.

Chain extenders used in the above-described polyol skeletons, if desired, can include polyhydric alcohols as described above, aliphatic polyamines (such as ethylenediamine), alicyclic polyamines (such as cyclohexylenediamine) and aromatic polyamines (such as phenylenediamine and 3,3'-dichloro-4,4'-diaminodiphenylmethane).

Conditions under which the polyurethane skeletons are formed by reaction of the polyol skeletons with the polyisocyanates are variously established according to the purpose sought as understood by technicians in the field. For example, in producing the polycarbonate polyurethanes, prepolymers are manufactured by heating at a temperature of 60° to 100° C. for several hours, in the presence of amide, sulfoxide, cyclic ether, ketone or glycol ether solvents if desired, and the reaction is further continued at the same temperature for several hours. These polyurethane skeletons may be reacted with the above-described chain extenders.

Methods for producing the polyurethane resins used in the present invention by introducing the hydroxyl groups and the polar groups in the polyurethane skeletons include a method in which polymerizable monomer components having the hydroxyl groups and the polar groups are as substituents used as components for forming the above-described polyurethane skeletons.

Particularly preferred polyurethane resins are obtained by selecting polyurethane skeletons having polar groups having a glass transition temperature (Tg) of at least 0° C. and having isocyanate groups at their termini, and by reacting the selected polyurethane skeletons with polyols, and preferably with polyols which are trihydric to hexahydric branched alcohol compounds having hydroxyl groups at their termini and preferably having 5 to 60 carbon atoms.

Preferred specific examples of the above-mentioned branched alcohol compounds include the following compounds:

(1) $HC[(CH_2)_{15}OH]_3$
(2) $C[(CH_2)_{10}OH]_4$
(3) $HC[(CH_2)_{10}OH]_3$
(4) $CH_3CH_2C[CH_2o(Ch_2CH_2O)_4H]_3$
(5) Trimethylolpropane
(6) Pentaerythritol
(7) Dipentaerythritol The polyurethane resins having the polar groups and at least 3 hydroxyl groups per molecule which are used in the present invention are preferably 20,000 to 100,000 in weight-average molecular weight, and more preferably 40,000 to 60,000 in weight-average molecular weight.

The glass transition temperature (Tg) of the polyurethane resins is preferably $-30°$ to 70° C., and more preferably 0° to 70° C. The amount of the hydroxyl groups is preferably at least 3 groups per molecule, and more preferably 3 to 10 groups per molecule.

Of the binder components used in the present invention, the polar group-containing vinyl chloride copolymers can include the following compounds.

The vinyl chloride copolymers are composed of the monomer units of vinyl chloride and monomer units, in general, having specific polar groups.

The monomer units having the polar groups are selected from any of $-SO_3M$, $-OSO_3M$, $-COOM$, and $-PO(OM')_2$ (in the above formulae, M and M' have the same meanings as given above). The vinyl chloride copolymers may contain these polar group containing monomer units alone or in combinations of two or more. These polar groups are contained in amounts of $1 \times 10^{-5}$ to $5 \times 10^{-4}$ eq/g in the vinyl chloride copolymer. The average degree of polymerization of the vinyl chloride copolymers is in the range of 200 to 500, and preferably in the range of 250 to 450.

The vinyl chloride copolymers having the specific polar groups described herein can be prepared by copolymerizing monomers having both the polar groups and reactive double bonds according conventional techniques as disclosed in U.S. Pat. No. 4,784,914.

Examples of the monomers having both the reactive double bonds and the polar groups which are used for introduction of the polar groups into the vinyl chloride copolymer include 2-(meth)acrylamido-2-methylpropanesulfonic acid, vinylsulfonic acid and sodium or potassium salts thereof, (meth)acrylic acid-2-ethyl sulfonate and sodium or potassium salts thereof, maleic acid (anhydride), (meth)acrylic acid and (meth)acrylic acid-2-phosphoric esters. When epoxy groups are introduced, glycidyl (meth)acrylate is generally used as the monomer having the reactive double bonds and the epoxy group.

It is suitable that the content of the epoxy groups is $5 \times 10^{-5}$ to $2 \times 10^{-3}$ eq/g.

Alternatively, a method can also be employed in which the polar groups are introduced by hydrochloric acid elimination reaction of a hydroxyl group-containing vinyl chloride copolymer preliminarily prepared with a compound containing a polar group and a chlorine atom (such as monochloroacetic acid and epichlorohydrin for introducing the epoxy groups).

When the vinyl chloride copolymers are synthesized, it is also possible to improve the copolymers by allowing other monomers such as vinyl ethers, α-monoolefins, acrylates, unsaturated nitriles, aromatic vinyl compounds and vinyl esters to be incorporated into the copolymer, provided the amount of such other monomers contained in the vinyl chloride copolymers is usually 20 mol% or less when the other monomers are used.

Methods for introducing the above-described polar groups into the vinyl chloride copolymers are described in JP-A-57-44227, JP-A-58-108032, JP-A-59-8127 and JP-A-60-101161. In the present invention, these methods can also be utilized.

Of the binder components used in the present invention, the polyisocyanates include isocyanates such as tolylene diisocyanate, 4,4'-diphenylmethane diisocyanate, hexamethylene diisocyanate, xylylene diisocyanate, naphthylene-1,5-diisocyanate, o-toluidine isocyanate, isophorone diisocyanate and triphenylmethane triisocyanate; reaction products of these isocyanates with polyalcohols; and 2- to 15-mer polyisocyanates formed by condensation of isocyanates. It is suitable that the weight-average molecular weight of these polyisocyanates is 100 to 20,000. These isocyanates are commercially available under the trade names of Coronate L, Coronate HL, Coronate 2030, Coronate 2031, Millionate MR and Millionate MTL (manufactured by Nippon Polyurethane Co., Ltd.); Takenate D-102, Takenate D-110N, Takenate D-200, Takenate D-202, Takenate 300S and Takenate 500 (manufactured by Takeda Chemical Industries, Ltd.); and Sumidule T-80, Sumidule 44S, Sumidule PF, Sumidule L, Sumidule N, Desmodule L, Desmodule IL. Desmodule N, Desmodule HL, Desmodule T65, Desmodule 15, Desmodule R, Desmodule RF, Desmodule SL and Desmodule Z4273 (manufactured by Sumitomo Bayer Co., Ltd.). These polyisocyanates can be used alone or in combinations of two or more thereof, utilizing the difference in hardening reactivity.

In the production of the magnetic recording media of the present invention, kneading, dispersion, orientation, coating, drying and calender treatment are carried out as follows.

The ferromagnetic powder, the vinyl chloride copolymer, the polyurethane resin and a solvent (together with carbon black and the abrasive agent if required) are mixed and kneaded with a conventional kneader such as a continuous kneader, a pressure kneader or an open kneader, and dispersed by using a ball mill or a sand mill for 10 to 20 hours, followed by addition of the polyisocyanate, a lubricating agent and a solvent (e.g., methyl ethyl ketone, cyclohexanone, toluene, methyl isobutyl ketone, tetrahydrofuran, butyl acetate, and ethyl acetate) to obtain a coating solution.

The magnetic layer coating solution is applied to the non-magnetic support having a thickness of 3 to 80 μm, preferably 5 to 40 μm to form a magnetic layer having a thickness of 0.2 to 6.0 μm, preferably 0.5 to 6.0 μm, more preferably 0.8 to 4.0 μm, and then, the orientation is conducted by a permanent magnet (1,000 to 4,000 G) or a solenoid. This orientation may be performed by the combination of the permanent magnet and the solenoid, and the magnetic layer may be dried in a magnetic field.

When disc-like media are produced, random orientation is preferably conducted.

The super calender treatment is carried out as described above.

Examples of materials for the non-magnetic supports include polyester resins, polyolefin resins, cellulose derivatives, polycarbonate resins, polyimide resins and polyamideimide resins. According to the purpose sought, non-magnetic metals such as aluminum, copper, tin, zinc and non-magnetic metals containing them, plastics on which metals such as aluminum are evaporated, and paper such as paper coated or laminated with polyolefins can also be employed as the non-magnetic support. The form of the non-magnetic supports is not particularly limited, but the sheet-like supports are usually used. The non-magnetic supports may be shaped like films, tapes, discs, cards or drums.

When the tape-like non-magnetic supports are used, they generally have a thickness in the range of 5 to 50 μm.

The non-magnetic support may be provided with a back coat layer on the side which is not provided with the magnetic layer.

The magnetic layers may contain additives generally used such as lubricating agents, abrasive agents, dispersing agents, antistatic agents and rust preventives.

Examples of substances which can be used as the lubricating agents include saturated or unsaturated higher fatty acids, fatty acid esters, higher fatty acid amides, higher alcohols, silicone oils, mineral oils, vegetable oils, fluorine-containing compounds and solid lubricating agents such as graphite.

Examples of substances which can be used as the abrasive agents include $\alpha$-$Al_2O_3$, $Cr_2O_3$, $\alpha$-$Fe_2O_3$, SiC, TiC, $ZrO_2$ and $CeO_2$.

Examples of substances which can be used as the dispersing agents include lecithin, aliphatic acids, silane coupling agents and titanium coupling agents.

Examples of the antistatic agents include carbon black, cationic surfactants, anionic surfactants, nonionic surfactants, $SnO_2$ powder, and non-magnetic metal powder of Ag or Cu.

The conventional magnetic recording media are produced by forming the magnetic layers on the sheet-like or film-like supports by coating methods. Basically, the magnetic recording media of the present invention can also be produced by similar methods.

According to the present invention, not only the reproduced outputs are raised by increasing the filling rate of the surfaces of the magnetic layers, but also the magnetic recording media excellent in high density recording in the short wavelength recording ($\lambda \leq 0.6$ μm) can be obtained by reducing noises, improving the C/N and increasing the saturation magnetization by using the ferromagnetic powders having a specific size (a length in the long axis of 2,000 Å or less).

The filling rate can be improved without impairing mechanical strength and lubricity by reducing the amount of the low molecular weight binder component (polyisocyanate), and compensating for a decrease in crosslinking density caused thereby with the enhanced reactivity of the polyurethane resin having at least three hydroxyl groups per molecule and the above-described polar groups, and calendering with the metal rolls. Consequently, the magnetic recording media of the present invention is excellent in durability and running properties and suitable for short wavelength recording.

The present invention will be described with reference to the following Examples and Comparative Examples, in which all parts and ratios are by weight.

EXAMPLES

| Basic Formulation | |
|---|---|
| Ferromagnetic alloy powder | 100 parts |
| Fe—Ni alloy | |
| σs: 130 emu/g | |
| Specific Surface Area (SSA): 50 m$^2$/g | |
| Length in the long axis: 1,800 Å | |
| Vinyl chloride copolymer | 12 parts |
| Average degree of polymerization: 350 | |
| —SO$_3$Na: $5 \times 10^{-5}$ eq/g (unless otherwise indicated hereinafter) | |
| Containing epoxy ($1.5 \times 10^{-4}$ eq/g) and —OH groups | |
| Polyurethane | 8 parts |
| Mw: 45,000 | |
| —SO$_3$Na: $8 \times 10^{-5}$ eq/g | |
| Polyisocyanate | 5 parts |
| Coronate L | |
| Polyurethane/Polyisocyanate (unless otherwise indicated hereinafter) | 1/0.625 |
| Carbon black | 1 part |
| (average particle size: 40 μm) | |
| α-Alumina | 8 parts |
| (average particle size: 0.3 μm) | |
| Stearic acid | 0.5 part |
| Butyl stearate | 1.5 parts |
| MEK/anone (1/1) | 200 parts |

A tape was produced using the components described above by the following steps.

The ferromagnetic alloy powder, carbon black, α-alumina, the vinyl chloride copolymer and the polyurethane were kneaded, and MEK/anone (150 parts) was further added thereto, followed by dispersion with a ball mill for 20 hours. Then, stearic acid, butyl stearate, MEK/anone (50 parts) and the polyisocyanate were added thereto to prepare a coating solution. The coating solution was applied to a polyethylene terephthalate (PET) support (having a thickness of 10 μm) so as to form a magnetic layer having a thickness of 3 μm, followed by orientation with a Co magnet (4,000 G) and drying. Then, the coated support was provided with a back layer (having a thickness of 0.5 μm) and treated under the following calendering conditions, followed by slitting to a width of 8 mm to obtain a 8-mm video tape.

The calendering conditions were as follows:

Roll A
  Material: a metal roll chrome plated for rust prevention
  Young's modulus: 21,000 kg/mm$^2$
  Vickers hardness: 800 degrees
  Surface roughness (Ra): 8 nm (cutoff value: 0.25 mm)

Roll B
  Material: a metal roll chrome plated for rust prevention
  Young's modulus: 21,000 kg/mm$^2$
  Vickers hardness: 800 degrees
  Surface roughness (Ra): 20 nm (cutoff value: 0.25 mm)

Roll C
  Material: a nylon roll in which nylon is wrapped around a metal core to a thickness of about 10 mm.
  Young's modulus: 400 kg/mm$^2$
  Surface roughness (Ra) 10 nm The sample Nos. 1-12 and 15 were calendered at a temperature of 80° C. under a calender nip pressure of 250 kg/cm, using a five-stage vertical super calender unit comprising three stages of heated metal rolls and two stages of unheated metal rolls arranged alternately between heated and non-heated stages.

Similarly, tapes were produced under the conditions shown in Table 1, with the exception that the above-described unheated metal rolls were replaced by the nylon rolls for the samples of Nos. 13 and 14.

The resulting tapes were evaluated by the following measuring methods. The results are shown in Table 1.

(1) C/N

Using a commercial 8-mm video tape recorder (FUJIX 8 manufactured by Fuji Photo Film Co., Ltd.), a 5-MHz signal was recorded on a tape, and the noise generated at 4 MHz when this signal was reproduced was measured with a spectrum analyzer. The ratio of the reproduced signal to this noise was determined.

(2) RF Output

A video signal of image signal 50IRE was recorded by standard picture recording current. The mean value of the envelop of this reproduced RF output was measured with an oscilloscope, and the RF output was calculated from the following equation:

$$\text{RF output (dB)} = 20 \log_{10} V/V_0$$

wherein V represents the mean value and $V_0$ represents a standard value.

IRE means "The Institute of Radio Engineers".

(3) Running durability (passes before clogging)

Using a video tape recorder (FUJIX 8), P6-120 (108 m) was run over the entire length at 40° C. and 80% RH, and the number of passes until no signal was produced was counted.

TABLE 1

| Sample No. | Kerr rotational angle, θk (min) | Ferromagnetic Powder | | |
|---|---|---|---|---|
| | | σs (emu/g) | Length in Long Axis (Å) | Hc (Oe) |
| 1 | 9 | 130 | 1800 | 1600 |
| 2 | 6 | 115 | 1600 | 1500 |
| 3 | 3 | 95 | 1900 | 1450 |
| 4 | 8.5 | 130 | 2500 | 1550 |
| 5 | 10.5 | 145 | 1900 | 1650 |
| 6 | 5.5 | 130 | 1750 | 1350 |
| 7 | 4.5 | 130 | 1800 | 1600 |
| 8 | 6 | 130 | 1800 | 1600 |
| 9 | 7.5 | 130 | 1800 | 1600 |
| 10 | 8 | 130 | 1800 | 1600 |
| 11 | 8.5 | 130 | 1800 | 1600 |
| 12 | 4.5 | 130 | 1800 | 1600 |
| 13 | 4 | 130 | 1800 | 1600 |
| 14 | 2.5 | 125 | 2500 | 1500 |
| 15 | 7.5 | 130 | 1800 | 1600 |

| Sample No. | Vinyl Chloride Copolymer Polar Group —SO$_3$Na (eq/g) | Polyurethane Resin | | Polyurethane/Polyisocyanate |
|---|---|---|---|---|
| | | Polar Group —SO$_3$Na (eq/g) | —OH (group/molecule) | |
| 1 | $5 \times 10^{-5}$ | $8 \times 10^{-5}$ | 4 | 1/0.625 |
| 2 | $5 \times 10^{-5}$ | $8 \times 10^{-5}$ | 4 | 1/0.625 |
| 3 | $5 \times 10^{-5}$ | $8 \times 10^{-5}$ | 4 | 1/0.625 |
| 4 | $5 \times 10^{-5}$ | $8 \times 10^{-5}$ | 4 | 1/0.625 |
| 5 | $5 \times 10^{-5}$ | $8 \times 10^{-5}$ | 4 | 1/0.625 |
| 6 | $5 \times 10^{-5}$ | $8 \times 10^{-5}$ | 4 | 1/0.625 |
| 7 | 0 | 0 | 4 | 1/0.625 |
| 8 | $5 \times 10^{-5}$ | 0 | 4 | 1/0.625 |
| 9 | 0 | $8 \times 10^{-5}$ | 4 | 1/0.625 |
| 10 | $2 \times 10^{-5}$ | $3 \times 10^{-5}$ | 4 | 1/0.625 |

TABLE 1-continued

| Sample No. | | | | |
|---|---|---|---|---|
| 11 | $5 \times 10^{-5}$ | $3 \times 10^{-5}$ | 4 | 1/0.625 |
| 12 | $5 \times 10^{-5}$ | $3 \times 10^{-5}$ | 2 | 1/1.5 |
| 13 | $5 \times 10^{-5}$ | $3 \times 10^{-5}$ | 4 | 1/0.625 |
| 14 | $5 \times 10^{-5}$ | $3 \times 10^{-5}$ | 2 | 1/1.4 |
| 15 | $5 \times 10^{-5}$ | $3 \times 10^{-5}$ | 4 | 1/0.625 |

| Sample No. | Calender Rolls | C/N | RF Output (dB) | Running Durability (passes before clogging) |
|---|---|---|---|---|
| 1 | A/A | 3.5 | 4.5 | 100 or more |
| 2 | A/A | 3.0 | 4.2 | 100 or more |
| 3 | A/A | 0.5 | 0.8 | 100 or more |
| 4 | A/A | 1.0 | 5.0 | 100 or more |
| 5 | A/A | 2.0 | 3.0 | 100 or more |
| 6 | A/A | 2.0 | 2.2 | 100 or more |
| 7 | A/A | 0.2 | 1.0 | 80 |
| 8 | A/A | 1.3 | 2.7 | 85 |
| 9 | A/A | 0.9 | 3.2 | 72 |
| 10 | A/A | 2.9 | 3.6 | 100 or more |
| 11 | A/A | 3.4 | 4.3 | 80 |
| 12 | A/A | 0.8 | 1.2 | 95 |
| 13 | A/C | 0.2 | 1.0 | 100 |
| 14 | A/C | 0 | 0 | 100 |
| 15 | B/B | 0.3 | 1.2 | 100 |

As apparent from the results shown in Table 1, all of the samples of Nos. 1, 2, 5, 6, 10 and 11 which are included in the scope of the present invention are excellent in C/N, RF output and running durability, and the electromagnetic characteristics are compatible with the running durability. However, when the Kerr rotational angle is less than 5 minutes as in Sample No. 3, or when the length in the long axis of the ferromagnetic powder exceeds 2,000 Å as in Sample No. 4, or when the binder contains no polar group as in Sample Nos. 7 to 9, or when the polyurethane resin contains less than 3 —OH groups and the content of the polyisocyanate is larger than that of the polyurethane in Sample No.12, or when the calender rolls are metal rolls/nylon rolls as in Sample Nos. 13 and 14, the electromagnetic characteristics, such as the C/N and the RF output, and the running durability cannot both be improved.

While the invention has been described in detail and with reference to specific embodiments thereof, it will be apparent to one skilled in the art that various changes and modifications can be made therein without departing from the spirit and scope thereof.

What is claimed is:

1. A magnetic recording medium having a non-magnetic support and a magnetic layer formed thereon, the magnetic layer containing a magnetic alloy powder and a binder, wherein said magnetic alloy powder has a length in the long axis of 2,000 Å or less and a saturation magnetization ($\sigma$s) of 100 emu/g or more; said binder contains a vinyl chloride copolymer, a polyisocyanate, and a polyurethane resin, wherein the polyurethane resin has at least 3 hydroxyl groups per molecule and at least $1 \times 10^{-5}$ eq/g of at least one type of polar group selected from the group consisting of —SO$_3$M, —OSO$_3$M, —COOM, —PO(OM')$_2$ and —OPO(OM')$_2$ (wherein each of M and M' represents a hydrogen atom, an alkali metal or ammonium ion) and the polyurethane resin is used in an amount equal to or more than by weight that of the polyisocyanate, and wherein the vinyl chloride copolymer has at least $1 \times 10^{-5}$ eq/g of at least one type of polar group selected from the group consisting of —SO$_3$M, —OSO$_3$M, —COOM, —PO(OM')$_2$ and —OPO(OM')$_2$ (wherein each of M and M' represents a hydrogen atom, an alkali metal or ammonium ion); and a Kerr rotational angle measured at a surface of the magnetic layer is 5 minutes or more.

2. The magnetic recording medium as in claim 1, wherein said magnetic alloy powder is selected from the group consisting of Fe, Co, an Fe-Co alloy, an Fe-Ni alloy, an Fe-Co-Ni alloy, a Co-Ni-P alloy, a Co-Ni-Fe-B alloy, an Fe-Ni-Zn alloy, a Ni—Co alloy, a Co-Ni-Fe alloy, an Fe-N alloy, an Fe-Co-Cr alloy and a Mn-Br alloy.

3. The magnetic recording medium as in claim 1, wherein said magnetic alloy powder has a saturation magnetization ($\sigma$s) of 100 to 140 emu/g.

4. The magnetic recording medium as in claim 1, wherein said polyurethane resin has $1 \times 10^{-5}$ to $5 \times 10^{-4}$ eq/g of the polar group.

5. The magnetic recording medium as in claim 1, wherein said polyurethane resin is selected from the group consisting of polyesterpolyurethanes, polyetherpolyurethanes, polycarbonatepolyurethanes and polycarbonateesterpolyurethanes.

6. The magnetic recording medium as in claim 1, wherein said polyurethane resin has a weight-average molecular weight of 20,000 to 100,000.

7. The magnetic recording medium as in claim 1, wherein the number of said hydroxy groups in said polyurethane resin is 3 to 10.

8. The magnetic recording medium as in claim 1, wherein said vinyl chloride copolymer has $1 \times 10^{-5}$ to $5 \times 10^{-4}$ eq/g of said polar group and the degree of polymerization of 200 to 500.

9. The magnetic recording medium as in claim 1, wherein said vinyl chloride copolymer further contains $5 \times 10^{-5}$ to $2 \times 10^{-3}$ eq/g of epoxy groups.

10. The magnetic recording medium as in claim 1, wherein said non-magnetic support has a thickness of 3 to 80 μm and said magnetic layer has a thickness of 0.2 to 6.0 μm.

* * * * *